United States Patent [19]

Brown et al.

[11] Patent Number: 4,687,107

[45] Date of Patent: Aug. 18, 1987

[54] APPARATUS FOR SIZING AND SORTING ARTICLES

[75] Inventors: Ian A. Brown; Dennis R. McMahon; Robin R. Rosas, all of Three Rivers; Stephen D. Scopatz, Simi Valley; Karen L. Wind, Three Rivers, all of Calif.

[73] Assignee: Pennwalt Corporation, Philadelphia, Pa.

[21] Appl. No.: 729,585

[22] Filed: May 2, 1985

[51] Int. Cl.$^4$ .................... B07C 5/00; G01B 11/10; G06F 15/62; H04N 5/335

[52] U.S. Cl. ...................... 209/556; 209/586; 209/587; 209/939; 356/379; 356/385; 358/107; 358/213.13; 364/506; 364/560; 364/564; 382/28

[58] Field of Search ........ 209/555, 556, 558, 563–565, 209/576, 577, 586, 587, 698, 912, 934, 939; 356/379, 380, 383–385; 358/101, 107, 212, 213; 364/506, 514, 560, 564, 579; 365/112; 369/112; 382/25, 28; 250/563

[56] References Cited

U.S. PATENT DOCUMENTS

| | | | |
|---|---|---|---|
| 3,975,262 | 8/1976 | Sherwood | 209/564 |
| 4,106,628 | 8/1978 | Warkentin et al. | 209/556 |
| 4,122,951 | 10/1978 | Alaminos | 209/587 X |
| 4,152,767 | 5/1979 | Laliotis | 364/560 |
| 4,246,098 | 1/1981 | Conway et al. | 209/558 |
| 4,271,967 | 6/1981 | Matsuo et al. | 209/558 |
| 4,344,091 | 8/1982 | Gardner et al. | 358/213 |
| 4,402,055 | 8/1983 | Lloyd et al. | 364/579 |
| 4,407,415 | 10/1983 | Böhme et al. | 209/556 |
| 4,441,125 | 4/1984 | Parkinson | 358/213 |
| 4,445,185 | 4/1984 | Davis, Jr. et al. | 364/514 |
| 4,515,275 | 5/1985 | Mills et al. | 209/558 |
| 4,585,126 | 4/1986 | Paddock et al. | 209/587 X |

FOREIGN PATENT DOCUMENTS

| | | | |
|---|---|---|---|
| 0089212 | 9/1983 | European Pat. Off. | 209/586 |
| 0155487 | 6/1982 | Fed. Rep. of Germany | 209/577 |
| 52-4887 | 1/1977 | Japan | 356/379 |
| 2079633 | 5/1981 | United Kingdom . | |
| 2126356 | 3/1984 | United Kingdom | 209/586 |

OTHER PUBLICATIONS

Murphy, Howard and Rothstein, Joe, *Schnelles Sortieren Mittels Bildsensoren in CCD-Technologie*, Messen and Prufen/Automatik, pp. 549–554 (Sep. 1980).

"A Television-Scanned, Digital Planimeter and Dimension Gage for Measuring Size of Agricultural Produce", by D. J. Buckley and W. E. McAdam, Nov. 4, 1971.

"*The Royal Greenwich Observatory (RGO) Charge Injection Device Camera System*", P. R. Jordan, I. G. van Breda, SPIE, vol. 290, Solid State Imagers for Astronomy (1981), PP. 113–119.

*Primary Examiner*—Robert B. Reeves
*Assistant Examiner*—Edward M. Wacyra
*Attorney, Agent, or Firm*—Seidel, Gonda, Goldhammer & Abbott

[57] ABSTRACT

Apparatus sorts articles according to any combination of plural criteria, including volume or diameter, length, shape, weight, color, density and surface quality. A light sensitive dynamic random access memory and novel processing circuitry are utilized for providing indications of the article's volume, diameter and length.

17 Claims, 10 Drawing Figures

APPARATUS FOR SIZING AND SORTING ARTICLES

BACKGROUND OF THE INVENTION

The present invention is directed generally to an apparatus and method for sorting articles. More particularly, the present invention is directed to an apparatus and method for sorting an article according to combined plural criteria, including the article's volume, length, diameter, weight, shape, density, color and/or surface quality. A novel means for obtaining dimensional data about the article, including the article's volume, diameter and overall length, is disclosed.

Apparatus for sorting articles according to weight only and according to a combination of color and weight is known. See U.S. Pat. No. 4,106,628 issued Aug. 15, 1978 for "Sorter For Fruit And The Like", incorporated herein by reference. Apparatus for sorting articles according to surface quality, physical size and/or color is also known. See U.S. application Ser. No. 430,068 filed Sept. 30, 1982, now U.S. Pat. No. 4,515,275, entitled "Apparatus And Method For Processing Fruit and The Like." See also U.S. Pat. No. 4,246,098 issued Jan. 20, 1981 entitled "Method And Apparatus For Detecting Blemishes On The Surface Of An Article." The sorting apparatus disclosed in the '098 patent examines an article while it is in free fall through an examining region and the optics and processing circuitry associated with that system are complex and expensive to manufacture.

The present invention has particular application in sorting commodities such as fruit which must be sized by volume or diameter. The most common prior art apparatus for sorting fruit according to volume comprises a series of sequential rollers which are spaced apart by a distance which increases from one pair of rollers to the next. The rollers are rotated causing the fruit to be transported from one end to the other. The fruit falls through the roller conveyor if the distance between the pair of rollers over which the fruit is being transported exceeds the diameter of the fruit. This apparatus, known as a "dimensional sizer", is mechanically complex and cannot be integrated with electronic sorting apparatus for sorting on the basis of plural criteria.

It is desirable to sort articles according to any combination of volume, diameter, weight, shape, density, color and/or surface quality. Prior art sizers do not provide this versatility. The present invention is directed to a simple, inexpensive but versatile apparatus for optically sizing articles such as fruit and for sorting those articles according to any combination of volume, length, diameter, weight, shape, density, color and/or surface quality.

SUMMARY OF THE INVENTION

An apparatus for sorting articles according to plural criteria comprises a roller singulator upon which articles to be sorted are transported through a plurality of inspection stations. The inspection stations may include any combination of the following: electronic color measurement apparatus; electronic surface quality measurement apparatus; weight measurement apparatus; and apparatus for providing an indication of the articles' volume, diameter and overall length. Electronic data signals having values indicative of these criteria are provided to a remote microcomputer which may, inter alia, compute article density based on the measured weight and volume, and article shape based upon its measured overall length and width. The microcomputer also receives user inputs that define various grades into which the articles are to be categorized and determine where articles of particular grades are to be discharged. The articles are transported over a plurality of sequentially arranged discharge locations where they are selectively discharged according to the user inputs and the articles' measured characteristics.

An optical sizing apparatus is utilized to provide an indication of each article's volume, diameter and overall length. An article is transported on a singulator up an incline until it reaches an apex. Disposed overhead the apex are a pair of light sources for illuminating the article and novel camera means and associated processing circuitry for receiving light reflected from the article and computing data words having values indicative of the article's volume, diameter and overall width. The camera means comprises a lens which focuses a planar image of the article onto an image sensing array. The image sensing array provides a digital image of the fruit represented by a plurality of digital "1's" and "0's". The processing circuitry reads the data in the array and performs the following functions:

(i) calculates values indicative of the length of cross section of substantially contiguous "slices" of the article. This is performed by modeling the article as a plurality of contiguous columns based upon the digital data stored in the array. Each column corresponds to a "slice" of the article and the length of each column is indicative of the length of the corresponding "slice". A value indicative of the length of each column is computed and modified to account for article movement during the exposure period of the array;

(ii) calculates a value indicative of the overall length of the article. This is performed by computing the number of columns between the first and last columns that model the article;

(iii) calculates a value indicative of the width (diameter) of the article. This is performed by determining the length of the centermost column of the columns that model the article;

(iv) calculates a value indicative of the volume of the article. This is performed by squaring the values indicative of the length of the columns and summing the squared values; and (v) transmits data words representing the volume, overall length and width of the article to the remote microcomputer for further processing.

The remote microcomputer receives the volume, diameter and length data from the optical sizing apparatus and may compute a mathematical value which relates to the article's shape. This is performed by dividing the value representative of the overall length of the article by the value representative of the overall width of the article. The remote microcomputer may also compute an indication of the article's density by dividing the value representative of the article's weight, as provided by the weight measurement apparatus, by the value representative of the article's volume.

A novel feature of the invention is the use of a light sensitive dynamic random access memory (hereinafter "optic RAM") as the image sensing array. The optic RAM has a plurality of individually addressable light sensitive memory cells and a single data output line for reading out the contents of a selected memory cell. As is known, a problem with such optic RAMs is that they must be periodically refreshed so that they maintain their data contents. Another problem is that the memory cells are not arranged in an order which readily facilitates processing the memory cells' data contents for determination of dimensional characteristics of the image. That is, there is not direct correspondence between the digital image stored in the optic RAM and the physical image of the article. Still another problem with known optic RAMs is that they cannot be readily interfaced to a microcomputer bus. The address protocol of the optic RAM is different than that of readily available microprocessors and special control signals are required to refresh the optic RAM, and to read from and write to the optic RAM's memory cells. Novel control and processing circuitry overcomes these problems and comprises:

(i) a microcomputer operative according to a control algorithm for processing data provided by the optic RAM, including "descrambling" the digital image stored in the optic RAM, computing the before described indications of article volume, width and length, and generating control signals;

(ii) means for interfacing the optic RAM inputs to the microcomputer, including means for converting a microprocessor generated address into a row and column address intelligible to the optic RAM, means for converting microcomputer generated control signals to specialized control signals required by the optic RAM, including signals for refreshing the data contents of the optic RAM and for allowing reading from and writing into selected memory cells, and means for controlling the exposure time of the optic RAM; and (iii) means for interfacing the optic RAM output to the microcomputer, including a serial to parallel data conversion means receiving the data bits provided at the optic RAM output and providing a parallel data word, and a data latch for holding the parallel data word until retrieved by the microcomputer.

It is an object of the present invention to provide an apparatus for sorting articles according to plural criteria.

It is another object of the invention to provide an apparatus for sorting articles, such as fruit, according to any combination of volume, overall length, diameter, weight, shape, density, color and surface quality.

It is still another object of the invention to provide an apparatus for optically sizing an article.

It is another object of the invention to provide an apparatus for optically sizing an article and providing an indication of the article's volume.

It is another object of the invention to provide an apparatus for optically sizing an article and providing a mathematical indication of the article's shape.

It is still another object of the invention to optically size an article and provide indications of the article's diameter, overall length and width.

It is another object of the invention to provide a digital image processing apparatus utilizing a light sensitive dynamic random access memory and control and processing circuitry therefor.

Other objects will become evident hereinafter.

DESCRIPTION OF THE PREFERRED EMBODIMENT

Figure 1:
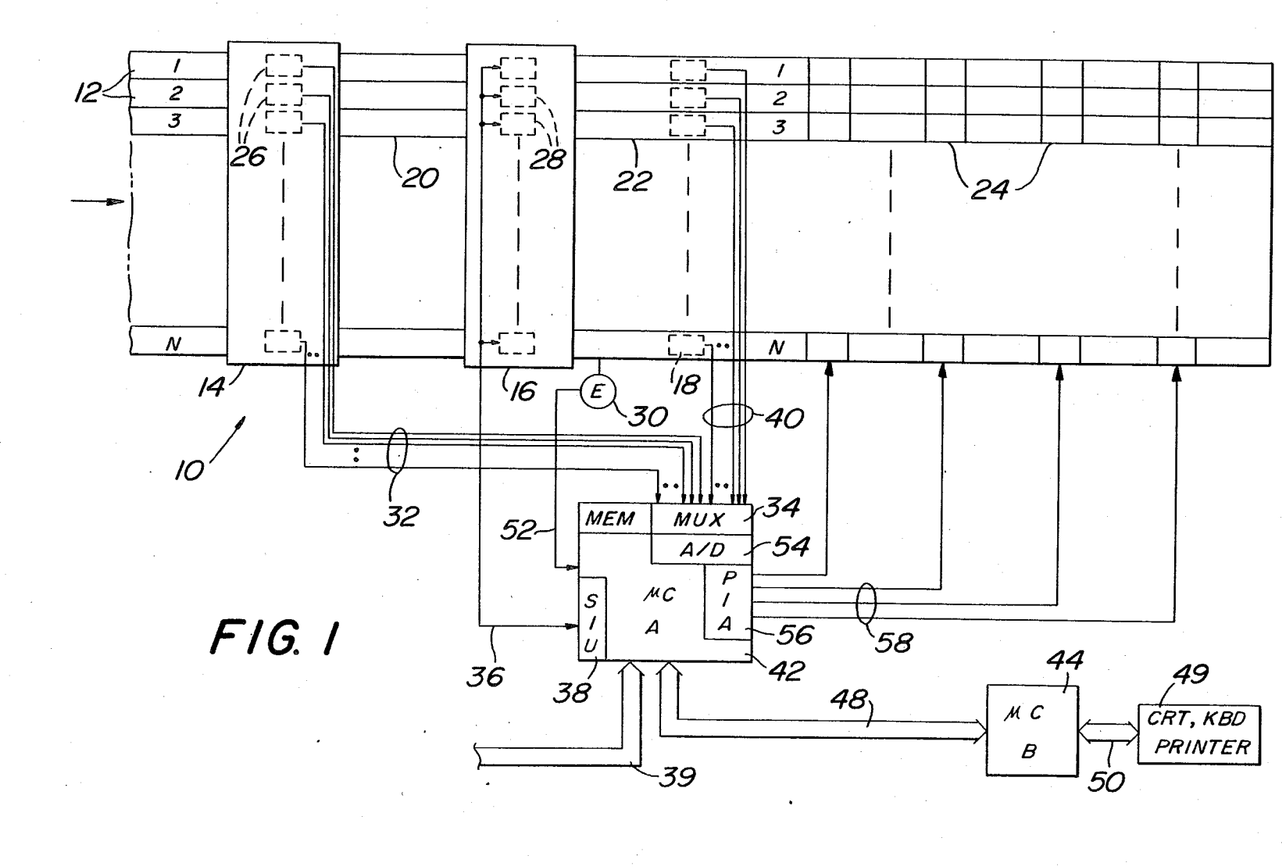
FIG. 1 is a simplified top plan view of an apparatus for sorting articles according to plural criteria and a simplified block diagram of an electronic system used in connection with the practice of the invention.

Referring now to the drawings wherein like numerals represent like elements, there is shown in FIG. 1 a sorting apparatus labeled generally 10. Sorting apparatus 10 comprises plural lanes 12 for transporting articles to be sorted. Each lane 12 comprises a singulator 20 for transporting articles beneath an electronic color measuring apparatus 14 and an optical sizing apparatus 16. After passing beneath optical sizing apparatus 16, the articles transported on singulator 20 are deposited into the individual cups of a cup conveyor 22. The individual cups are transported over weight scales 18 and then over a plurality of sequentially arranged discharge stations 24. The details of the construction and operation of each lane 12, including singulator 20, cup conveyor 22, weight scales 18 and discharge stations 24 are well-known. See U.S. Pat. No. 4,106,628, incorporated herein by reference.

Color measuring apparatus 14 contains a plurality of individual color measuring units 26, one for each lane 12. As each article is transported on the singulator 20 beneath its associated color measuring unit 26, an analog signal having a value dependent upon the article's surface color is provided on a respective one of the lines 32 to multiplexer 34. The color measuring units may be those disclosed in aforementioned U.S. Pat. No. 4,106,628, although any well-known color measuring unit may be used therefor. Optical sizing apparatus 16 is also disposed over the singulator and comprises a plurality of individual optical sizing units 28, one for each lane 12. The details of each individual optical sizing unit 28 will be described in detail herein. Each optical sizing unit 28 bi-directionally communicates along a line 36 with a microcomputer 42 via means of serial interface unit ("SIU") 38. Data provided by optical sizing units 28 to microcomputer 42 is indicative of the volume, diameter and overall length of the article beneath.

After passing beneath optical sizing apparatus 28, the article is deposited into one of the cups in cup conveyor 22, as more fully explained in U.S. Pat. No. 4,106,628. Each cup is transported over an in-track weight scale 18, again as described in U.S. Pat. No. 4,106,628. Analog signals indicative of the article's weight are provided along respective ones of the lines 40 to multiplexer 34.

Multiplexer 34 operates under control of microcomputer 42 in well-known manner to select one of the lines 32 or 40. Analog to digital converter 54 converts the analog signal present on the selected line 32 or 40 to a digital signal for processing by microcomputer 42.

Microcomputer 42 may also receive data on a bus 39 from a surface quality measuring apparatus (not shown). Any well-known surface quality measuring device may be utilized, such as that disclosed in U.S. Pat. application Ser. No. 430,068 filed Sept. 30, 1982, now U.S. Pat. No. 4,515,275 entitled "Apparatus And Method For Processing Fruit And The Like", incorporated herein by reference.

A shaft encoder 30 is coupled to singulator 20 and provides a pulse each time the pockets in singulator 20 have moved a predeterminded distance. The pulse is provided to microcomputer 42 via line 52 as an interrupt signal. Microcomputer 42 utilizes the pulse to keep track of the position of each item on the singulator 20 and cup conveyor 22, as described in U.S. Pat. No. 4,106,628. Microcomputer 42 also communicates with a peripheral interface adapter (PIA) 56 having outputs connected to each of the individual discharge stations 24 via lines 58. The construction and operation of discharge stations 24 is well known and described in detail in U.S. Pat. No. 4,106,628. Briefly, when any one of the discharge stations 24 receives an energizing signal on its corresponding line 58, a solenoid is actuated and retracts a pin covering a gap in the cup conveyor 22, thereby causing the cup over the discharge station 24 to fall and discharge the item.

Microcomputer 42 bi-directionally communicates with a microcomputer 44 via bus 48. Microcomputer 44 receives user input data from a keyboard via bus 50 for purposes to be described hereinafter. Briefly, user input data defines (i) the grades into which articles of various volumes or diameters, densities, shapes, weights, colors, and/or surface qualities are to be categorized and (ii) the discharge locations where articles of the various grades are to be discharged. Microcomputer 42 determines which one of the discharge locations 24 should receive the article based on the article's actual volume, diameter, weight, etc. and the user inputs provided by microcomputer 44. Microcomputer 42 provides information such as tally data to microcomputer 44 for display on a CRT or printer 49.

Figure 2:
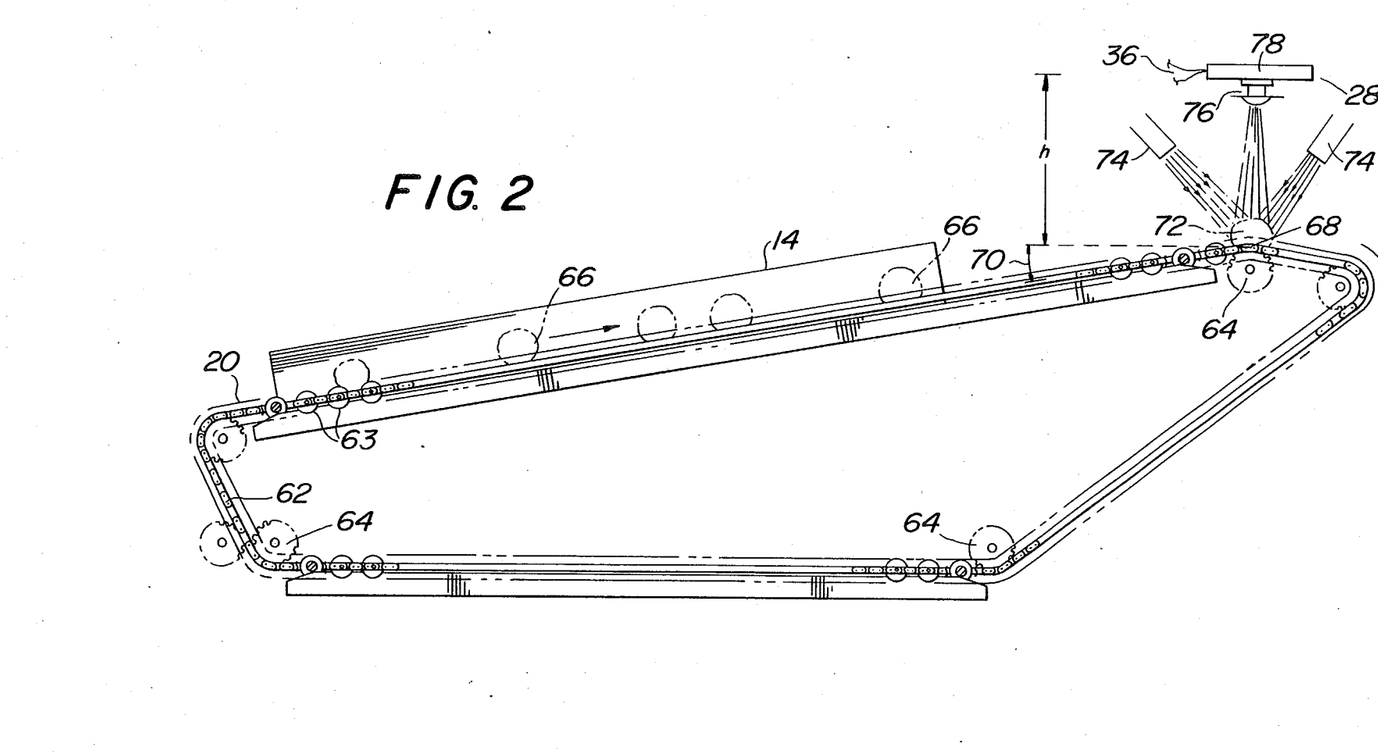
FIG. 2 is a side elevational view of an article transport structure used in connection with the practice of the present invention and illustrates the placement of the optical sizing apparatus.

Referring now to FIG. 2, there is illustrated a modification to the basic singulator arrangement disclosed in U.S. Pat. No. 4,106,628. In particular, singulator 20 is modified so that it is inclined and reaches an apex at a location 68 disposed directly beneath its associated optical sizing unit 28. Preferably, the angle 70 between singulator 20 and the horizontal is 10°. The reason for providing the incline is explained below.

Sprockets 64 are driven by a motor (not shown), which in turn drives a chain 62 connected in a continuous loop. Connected to the chain links are spaced apart rollers 63. The space between adjacent rollers defines a "pocket" into which an article 66 is deposited for transport on the singulator. When an article 72 reaches the apex 68, it is illuminated by light emitted by light sources 74. Apex 68 enables the entire upper surface of article 72 to be illuminated regardless of any articles in the preceeding or succeeding pockets. Thus, but for the apex 68 created by the incline of singulator 20, the entire upper surface of article 72 may not be illuminated and erroneous data could be supplied to optical sizing unit 28.

Optical sizing unit 28 comprises a lens 76 which receives light reflected from the upper surface of the article 72 and focuses a planar image of the article 72 onto an image sensing array on a circuit board 78. Also contained on circuit board 78 is processing circuitry including a microcomputer for processing data signals provided by the image sensing array and providing data words indicative of the volume, diameter and overall length of article 72. These data words are provided on a serial line 36 to microcomputer 42, as previously mentioned.

Preferably, the elevation h of optical sizing unit 28 above apex 68 is such that the viewing area of the image sensing array equals the distance between sequential rollers 63 of singulator 20. Those skilled in the art will recognize that the elevation h is also related to the characteristics of lens 76.

Figures 3, 4:
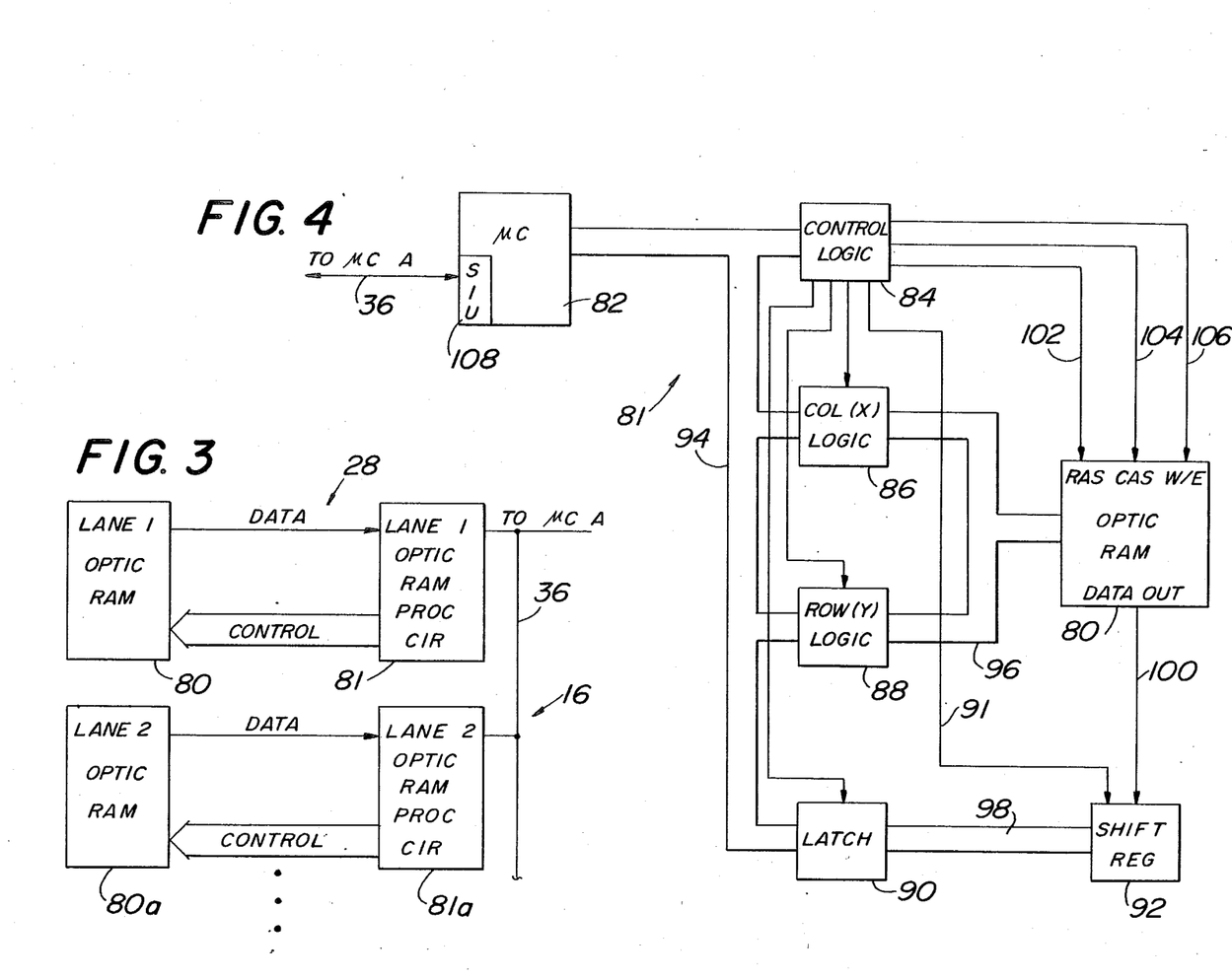
FIG. 3 is a simplified block diagram of the electronic systems associated with the optical sizing apparatus.
FIG. 4 is a simplified block diagram of the electronic subsystems associated with each optical sizing apparatus.

Referring now to FIGS. 3 and 4, details of the optical sizing apparatus 16, and in particular of each optical sizing unit 28, will be explained.

As mentioned, associated with each lane 12 is an optical sizing unit 28 disposed overhead the path of the article at apex 68. Each sizing unit 28 comprises an image sensing device 80 communicating with and controlled by processing circuitry 81. Processing circuitry 81 processes data supplied by image sensing device 80 and provides data words having values indicative of the volume, diameter and overall length of the article beneath the image sensing device 80.

FIG. 4 is a simplified block diagram of the processing circuitry 81 associated with image sensing device 80. Processing circuitry 81 comprises a microcomputer 82 communicating with logic circuits 84, 86, 88 and 90. In the preferred embodiment, the image sensing device 80 is a light sensitive dynamic random access memory ("optic RAM") of the type disclosed in U.S. Pat. No. 4,441,125 issued Apr. 3, 1984 entitled "Image Sensor Using Dynamic Random Access Memory", incorporated herein by reference. Such device is commercially available from Micron Technology, Inc., Boise Id., and is sold under the designation IS32. As explained in the '125 patent, such optic RAM contains an array of photo sensitive cells or "pixels" which assume a data state (digital "1" or digital "0") depending upon the intensity and duration of light impinging thereon. As still further explained in the '125 patent, optic RAM 80 has control inputs RAS (row address strobe), CAS (column address strobe) and WE (write enable). The memory cells are individually addressable for reading data from and writing data into them by appropriately strobing the RAS, CAS, and WE lines and by placing an appropriate address on bus 96. When in a READ mode, the digital state, 1 or 0, of the selected memory cell is provided on the data output line 100. In the WRITE mode, each individual memory cell may be written into for the purpose of initialization, i.e., the array may be initialized to a preselected state, e.g., all digital "1's" or "0's". As is known, such optic RAM also requires periodic refreshing to maintain the data contents of the memory cells. The memory cells are light sensitive whenever they are not being refreshed. Hence, the contents of the memory cells are constantly being altered depending upon the image focused thereon and whether a refresh is being performed.

In the preferred embodiment microcomputer 82 is an Intel i8744. The i8744 is equipped with a serial interface unit (SIU) as schematically illustrated at 108 in FIG. 4. Serial interface unit 108 conveniently converts parallel data bits to serial data bits, and visa versa, for communication with peripheral devices, in this case microcomputer 42. As explained, microcomputer 42 is also equipped with a SIU 38 so that it may also bi-directionally communicate over serial data bus 36 with individual microcomputers 82 of each optical sizing unit 28. One of the functions of bus 36 is to communicate a command to each optical sizing unit 28 to begin a measurement each time microcomputer 42 receives an interrupt from encoder 30. Thus, an interrupt signal is generated by encoder 30 each time a pocket in singulator 20 moves into position at apex 68 and microcomputer 42 signals this event to microcomputer 82 via appropriate command signals on serial data bus 36.

Processing circuit 81 performs the following basic functions: (i) initializes optic RAM 80 by writing to all memory cells so that they are all initialized to the same data state (INITIALIZE cycle); (ii) permits the memory cells to change their data state according to the intensity of the incident light thereon, i.e., a digital image of the article is obtained (EXPOSE cycle); (iii) periodically refreshes the memory cells (REFRESH cycle) and (iv) after the EXPOSE cycle is completed, reads the contents of the memory cells out of optic RAM 80 (READ cycle). In the preferred embodiment, only eight memory cells are read during each READ cycle. In an INITIALIZE cycle, the entire array is initialized in the following sequence: initialize eight rows of memory cells, refresh, initialize the next eight rows of memory cells, refresh, etc. Each READ cycle and each INITIALIZE subcycle (an initialization of eight rows of memory cells) is always followed by a REFRESH cycle, since the memory cells "leak" and need to be refreshed before they change their data state. Also, in the preferred embodiment, the length of an EXPOSE cycle, i.e., exposure time, is 10 milliseconds, nominal. Hence, after an EXPOSE cycle, the optic RAM 80 contains a digital image of the article, if any, at apex 68. Thus, each memory cell which received reflected light from a corresponding segmental area of the article will be charged to a first data state (e.g., digital "1") and each memory cell which did not receive any reflected light or received insufficient reflected light will be charged to a second data state (e.g., digital "0"). It will be appreciated, therefore, that optic RAM 80 will contain a plurality of memory cells charged to first and second data states which cumulatively provide a digital image of the article. The memory cells are arranged in rows and columns, but, as is known, there is not direct correlation between the digital image represented by charged and uncharged rows and columns of memory cells and the actual planar image of the article. This is due to the architecture of optic RAM 80. Thus, one of the functions of microcomputer 82 is to correlate each data bit read from optic RAM 80 to a corresponding segmental area of the article.

After an EXPOSE cycle is completed, microcomputer 82 initiates a series of sequential READ/REFRESH instructions (READ followed by REFRESH). As mentioned, eight data bits are read from optic RAM 80 during each READ cycle. This is performed by selecting the starting row and column address (e.g., 0,0), and commanding column and row logic circuits 86, 88 to sequentially address eight memory cells while optic RAM 80 is in a READ state. The eight data bits are serially read onto data line 100 and shifted into serial in, parallel out shift register 92. Thus, shift register 92 performs a serial to parallel data conversion of the optic RAM 80 output. Control logic 84, in conjunction with column and row logic circuits 86, 88, determine when a read out of eight bits has been completed and then strobes, via line 91, the eight bit byte stored in shift register 92 into latch 90 via bus 98. A REFRESH cycle is executed, then microcomputer 82 retrieves the byte from latch 90 via bus 94 and the next eight bits are read from optic RAM 80. This process is repeated until the relevant contents (i.e., the image) of optic RAM 80 have been read out. Microcomputer 82 processes each eight bit byte as it is received in a manner to be described hereinafter.

Figure 5:
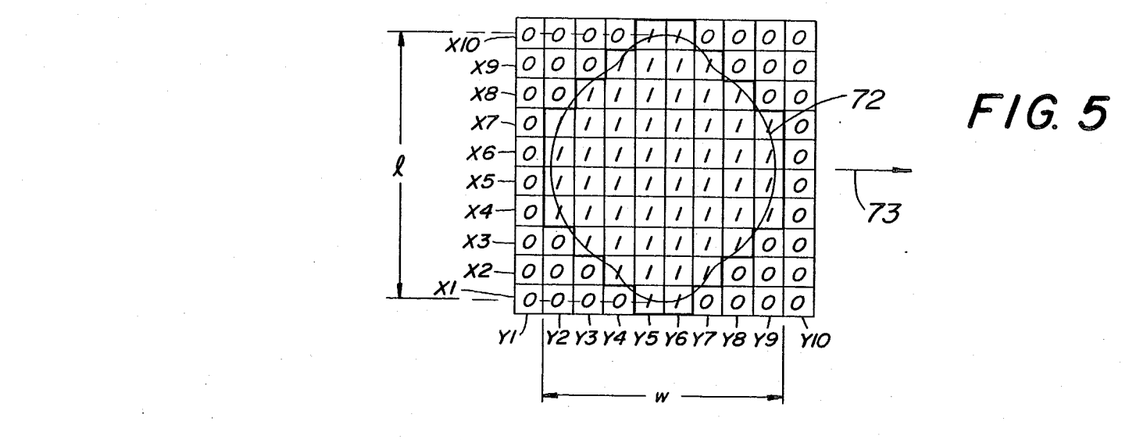
FIG. 5 illustrates conceptually how the optic RAM data is processed to obtain volume, diameter and width indications of the article.

FIG. 5 illustrates the concept involved in processing the digital data provided by optic RAM 80. The image of an article 72 is represented by a plurality of digital "1's" and "0's", arranged in rows Y1–Y10 and columns X1–X10. Although only ten rows and columns are illustrated, it should be understood, that, in practice, the array has many more rows and columns, (e.g., 256×128), so the resolution of the digital image is much improved. Each digital "1" corresponds to a segmental area of the article from which light was reflected and each digital "0" represents either a segmental area from which insufficient light was reflected or a background area from which no light was reflected. Thus, there are a plurality of adjacent columns of first data states, i.e., digital "1's", representing areas from which light was reflected. The length of each column of digital "1's" is indicative of the length of cross section of a corresponding "slice" of the article 72. Thus, for example, the length of the column of digital "1's" in column X4 is represented by the distance, i.e., number of rows, between row Y2 and row Y9, and this is indicative of the length of cross section of the corresponding "slice" of the article 72. As can be seen, the total number of adjacent columns X1–X10 of digital "1's" is indicative of the overall length 1 of article 72, and the length of the center column X5 of digital "1's" is indicative of the width w or diameter of the article. Thus, the number of columns between columns X1 and X10 is indicative of the article's overall length and the number of digital "1's" in the center column X5 of the image, which is the number of rows between rows Y2 and Y9, is indicative of the article's width or diameter.

An indication of the article's volume can be obtained by determining the length of each column X1–X10 of digital "1's", squaring the lengths and summing together the squared values. Thus, this method, in essence, treats each column of digital "1's" as a cylinder, computes the volume of each cylinder and adds the individual volumes together to approximate the volume of the article.

Before making the aforementioned computations, however, a correction must be made to account for the movement of the article 72 during the exposure period. Referring to FIG. 5, it will be appreciated that if the article is moving in the direction indicated by arrow 73 during the exposure time, the length of each column X1–X10 of digital "1's" will be longer than the actual image. The length computations previously described, therefore, must be corrected. This is done in the following manner.

Microcomputer 42 has internal timers and is capable of measuring elapsed time. Microcomputer 42 measures the elapsed time between sequential interrupts from shaft encoder 30 and provides a value indicative of the speed of singulator 20 to microcomputer 82 via bus 36. This is performed each time shaft encoder 30 generates an interrupt. The exposure time of the optic RAM is also known (in the preferred embodiment, 10 milliseconds, nominal, although this may be altered to suit the particular application). The number of rows of memory cells in optic RAM 80 through which the article image moves during the exposure time can be calculated. This value is stored as a constant in microcomputer 82's memory. Each time the length of one of the columns X1-X10 is calculated, the value of that length is modified by subtracting the constant therefrom.

Figure 6A:
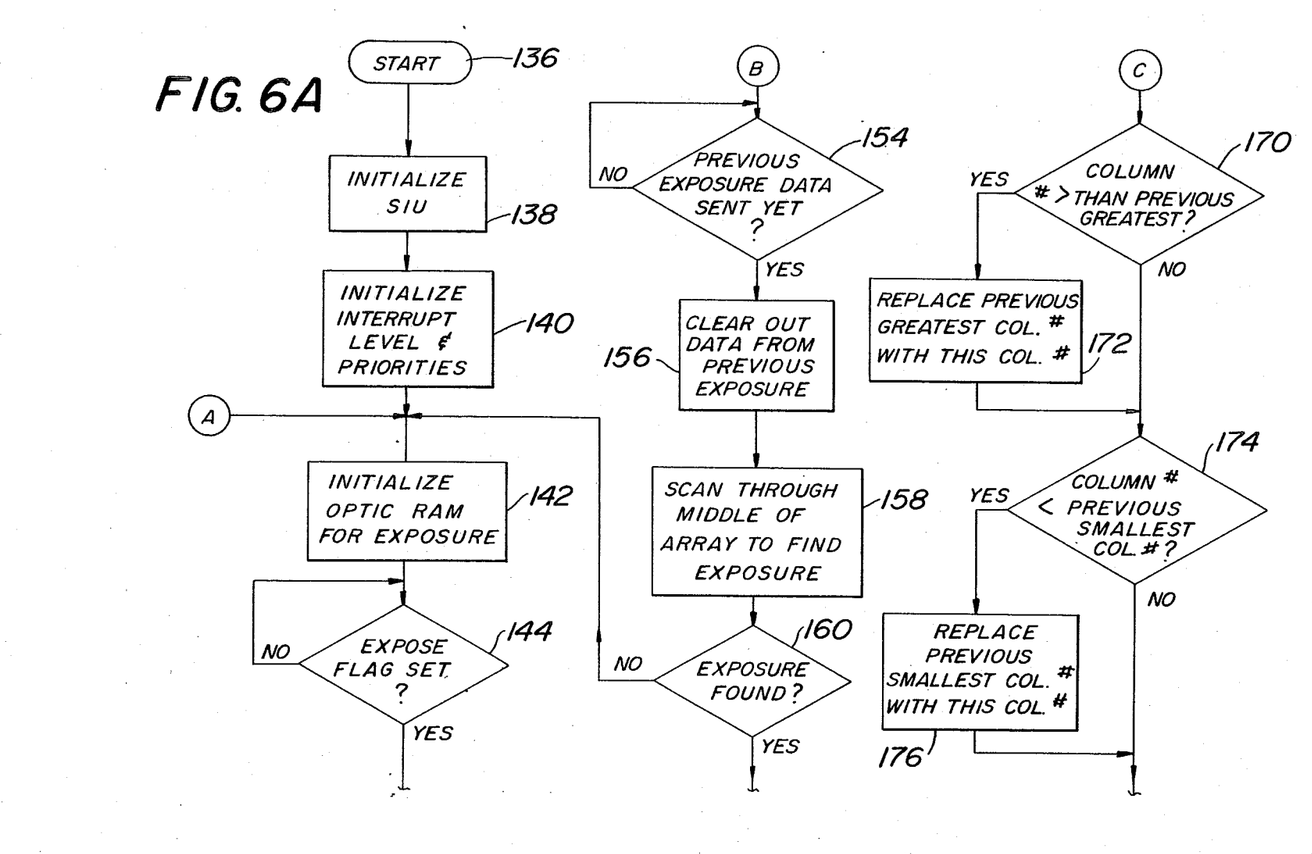
FIGS. 6A and 6B are a flow chart illustrating a control algorithm used by the optical sizer's processing circuitry.
Figure 6B:
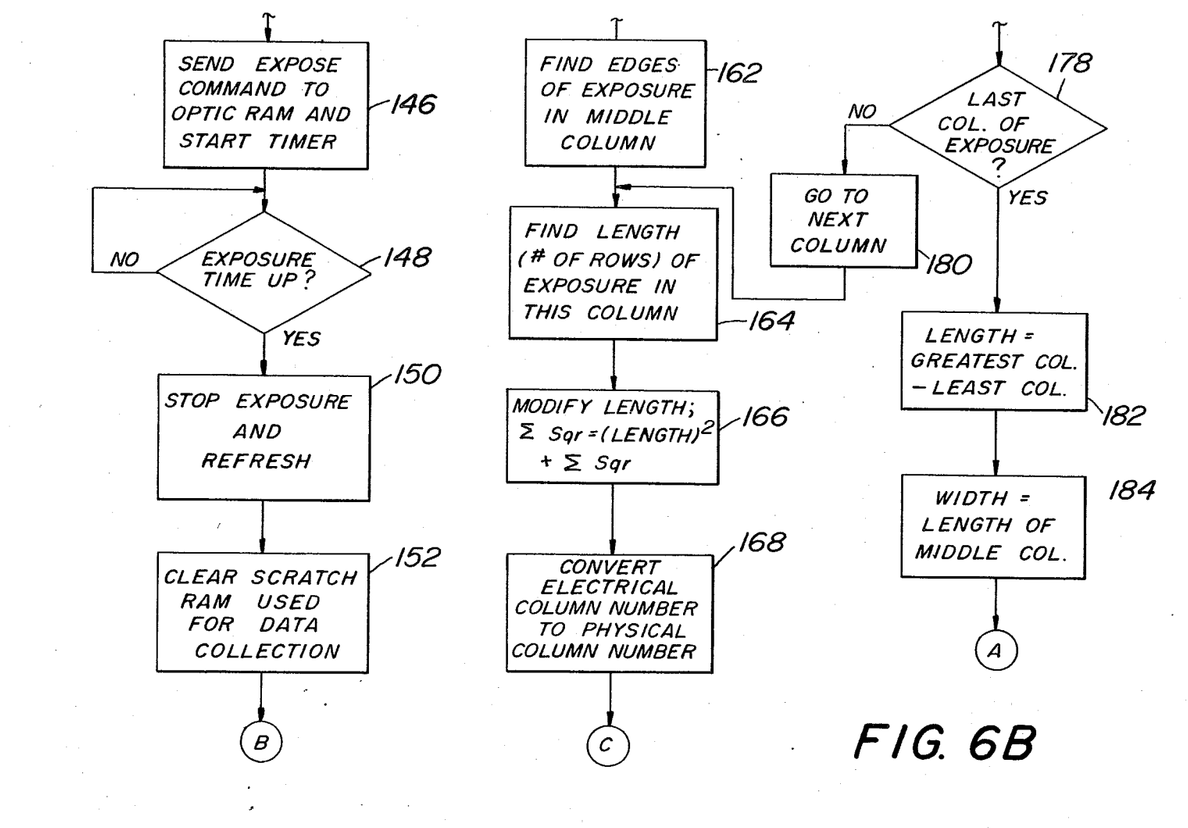

Referring now to FIGS. 6A and 6B, a preferred control algorithm for microcomputer 82 will be explained.

Blocks 136, 140 and 142 generally illustrate the functions performed by microcomputer 82 on a power-up condition or when a reset signal has been received. The first function, as illustrated at block 138, is to initialize the serial interface unit 108 to place it in condition for bi-directionally communicating with microcomputer 42. Those skilled in the art will realize that this is a straightforward and well known procedure. As illustrated at block 140, microcomputer 82's interrupt levels and command priorities are set. This would include, for example, assigning a priority to the command received from microcomputer 42 when encoder 30 generates an interrupt signal. As illustrated at block 142, the optic RAM is initialized in the manner described hereinafter.

The remainder of the functions illustrated in FIGS. 6A and 6B illustrate the functions that occur when microcomputer 82 responds to the command from microcomputer 42 to initiate a sizing measurement. Thus, when this command is received, it is desired to, inter alia, (i) execute an EXPOSE cycle to obtain a planar image (in the optic RAM) of the article, if any, at the apex 68, (ii) repeatedly transfer data bytes from the optic RAM to microcomputer 82 via a READ cycle (with a REFRESH cycle between each READ cycle), and (iii) "descramble" the data from the optic RAM 80 by rearranging the data bits so that they directly correlate to a corresponding segmental area of the article. The "descrambling" can be performed in any one of a number of ways, depending upon the architecture of the optic RAM. The manufacturer's data sheet for the IS32 optic RAM provides the actual architecture, and directly correlating each data bit read from the optic RAM to a corresponding segmental area of the article is a straightforward procedure. Those skilled in the art will recognize that this can be done by an appropriate correlation algorithm or by means of a correlation table (look up table).

As illustrated at block 142, microcomputer 82 sends appropriate commands to control logic 84 and column and row logic circuits 86, 88 to begin initializing the optic RAM 80 (INITIALIZE cycle). This is performed in the following manner. Control logic circuit 84 supplies appropriate signals to optic RAM 80 to place it in a WRITE mode. Column and row logic circuits 86, 88 sequentially address each memory cell in the first eight rows of the optic RAM and each of those cells is initialized. Control logic 84 then supplies appropriate signals to optic RAM 80 to place it in a REFRESH mode. Row logic circuit 88 then addresses and refreshes every row of memory cells in optic RAM 80. As is known, only a row address is required to refresh all memory cells in the addressed row, i.e., a column address is not needed. After the REFRESH cycle is completed, control logic 84 again places optic RAM 80 in the WRITE mode and the next eight rows of memory cells are initialized. This WRITE-REFRESH-WRITE-REFRESH sequence is repeated until the entire array has been initialized. This is the INITIALIZE function. Next, the functions illustrated at symbolic block 144 are performed.

As illustrated at block 144, microcomputer 82 waits for an EXPOSE flag to be set by serial interface unit 108. This occurs when unit 108 receives a command from microcomputer 42 to begin a sizing measurement. When this occurs, the functions illustrated in the remaining even numbered blocks 146-184 are performed. As illustrated in block 146, microcomputer 82 sends appropriate data signals to control logic 84, which in turn sends appropriate data signals to optic RAM 80 to begin an EXPOSE cycle. During the EXPOSE cycle, the memory cells are sensitive to reflected light and change their data state according to the amount of light intensity incident thereon, as previously explained. Microcomputer 82 keeps track of the exposure time (block 148), and after the selected exposure time has expired (10 milliseconds, nominal, in the preferred embodiment), control passes to block 150.

At block 150, microcomputer 82 instructs control logic 84 to stop the EXPOSE cycle and perform a REFRESH cycle. Control passes to block 152 where the contents of a scratch pad RAM associated with microcomputer 82, and used for making the calculations described herein, are cleared, except for the volume, overall length and width values calculated for the previous article. As shown at block 154, microcomputer 82 waits until serial interface unit 108 transmits these values to microcomputer 42, and then, as shown at block 156, the remainder of the RAM is cleared.

As shown at block 158, microcomputer 82 scans through the center of the optic RAM 80 to determine if there is an article present at apex 68. This is done by reading out data bits from a center row of the array, via shift register 92 and data latch 90, in the manner before described. If those data bits are digital "1's", then an article is present at apex 68 and control passes to block 162. If those data bits are digital "0's", however, then no article is present and control passes back to block 142. As mentioned, each READ cycle from optic RAM 80 is a read out of 8 data bits followed by a REFRESH cycle. A REFRESH cycle always follows a READ cycle.

At block 162, microcomputer 82 reads the data for the column corresponding to the center "slice" of the article and locates the "edges" of that column. That is, the row addresses of the "top" and "bottom" of the center column of digital "1's" are determined. As illustrated in the remaining even numbered blocks 164-184, microcomputer 82 repeatedly reads data (in 8 bit bytes) in the manner previously described from optic RAM 80 and performs the computations previously described to obtain values (data words) indicative of the volume, overall length and width of the article. Thus, as illustrated at block 164, the length of the center column of digital "1's" (i.e., the number of rows between the "edges") is determined. As shown in block 184, this is stored as an indication of article width. In FIG. 5, for example, this would be the number of row addresses between row Y2 and Y9. At block 166, the length value for this column is corrected to compensate for the movement of the article during exposure, as explained. Then, the modified length value is squared and added to a running total of all squared length values. As illustrated at block 168, microcomputer 82 correlates the data bits in each 8 bit byte read from optic RAM 80 to corresponding segmental areas of the article via a correlation algorithm or by means of a correlation table.

As illustrated in even-numbered symbolic blocks 170 through 180, microcomputer 82 repeatedly performs the functions illustrated in blocks 164, 166 and 168 until values indicative of the length of each column of digital "1's" and a value indicative of the volume of the article have been computed. When all columns have been so operated upon, the functions illustrated in block 182 are performed. At block 182, a value indicative of the overall length of the article is computed. This is performed by determining the number of column addresses between the first and last columns of digital "1's" that define the digital image. Thus, referring to FIG. 5, the number of row addresses between the first column X1 and the last column X10 is a value indicative of the overall length 1 of the article 72.

As mentioned, the length of the center column of the digital image is a value indicative of the width or diameter of the article. Thus, referring to FIG. 5, the number of row addresses between rows Y2 and Y9 is a value indicative of the width w of the article 72. After the functions illustrated in block 184 have been performed, control then passes back to block 142 where the optic RAM is re-initialized and microprocessor 82 waits for the next article to come into place for a sizing measurement.

Microcomputer 82 supplies data words having values indicative of the volume, overall length and width of the article to microcompuer 42 via serial data bus 36.

A control algorithm for microcomputer 42 will now be explained. As mentioned, microcomputer 42 assimilates all of the data pertaining to the article's color, volume, overall length, width, surface quality and weight, and makes a determination as to where this article should be discharged based on these combined characteristics and user inputs defining grades and discharge locations for each grade.

As is well-known in the art, articles such as fruit are categorized into grades according to one or more characteristics, such as weight alone, weight and color, etc. The grades are defined by user values which are input into the sorting machine and define boundary lines between grades. See e.g., U.S. Pat. No. 4,106,628. The actual weight, color, etc. of the fruit is compared to the grade values input by the user and the machine determines the proper grade into which the fruit should be categorized. Further, U.S. Pat. No. 4,106,628 teaches how particular grades of fruit may be assigned to different drop locations so that all fruit of the same grade will be discharged at the same location.

Figure 7:
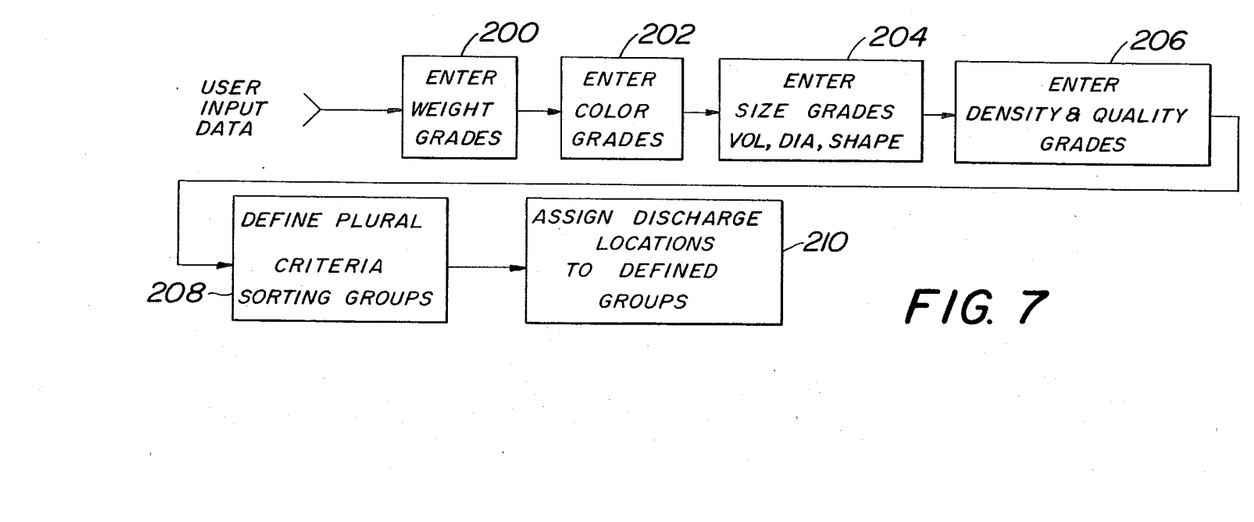
FIG. 7 illustrates a control algorithm for sorting objects according to plural criteria.

Microcomputer 44 receives user input data which defines the various grades and assigns discharge locations to those grades. As illustrated in FIG. 7, microcomputer 44 receives user input data defining the various weight grades (reference numeral 200), color grades (reference numeral 202), size grades (reference numeral 204), and density and quality grades (reference numeral 206). At block 204, the size grades may be defined on the basis of volume, diameter (width) or shape, or all three, if desired. Again, this is achieved in well-known manner simply by assigning values representative of the boundary between each grade. As illustrated at block 208, the user defines plural sorting groups into which the articles are to be sorted. Thus, the user defines whether the articles are to be graded upon their combined weight and color, combined weight and volume, combined color and volume, combined color and density, or any desired combination of volume, overall length, diameter, color, weight, density, shape and surface quality. At block 210, the user assigns discharge locations to the various defined grades. This may be done in any well-known manner, see e.g., U.S. Pat. No. 4,106,628 and U.S. Pat. No. 4,246,098. Thus, for example, this could be achieved by means of a simple look-up table which correlates discharge locations to the plural combined grades defined by the user. The user input data is supplied to microcomputer 42 via bus 48 for processing as explained below.

Figure 8:
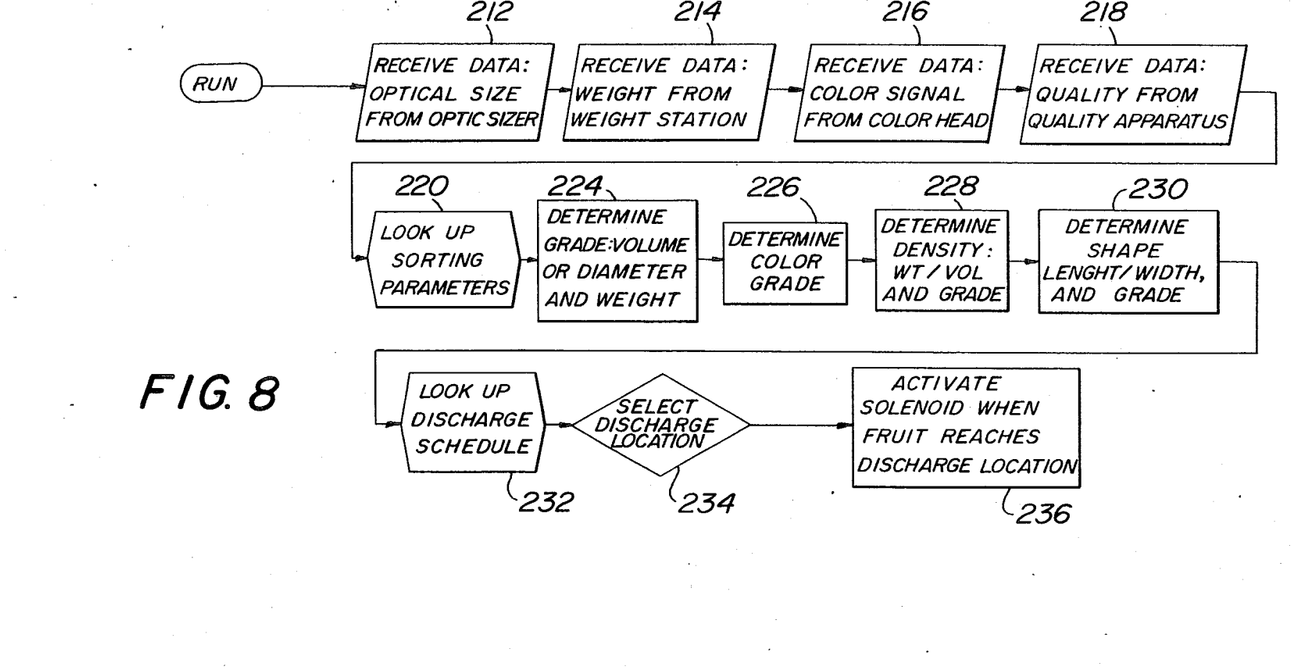
FIG. 8 illustrates a control algorithm for sorting objects according to plural criteria.

Turning now to FIG. 8, an algorithm for processing the data supplied to microcomputer 42 and for sorting fruit according to plural criteria is shown. The encoder pulses provided by encoder 30 allow microcomputer 42 to track the progression of each article from inspection station to inspection station to dicharge locations, in well known manner. As each article is transported along, microcomputer 42 retrieves the data provided by the inspection station where the article is currently located. Thus, in the "run" mode, microcomputer 42 receives the volume, overall length and diameter (width) data from the optical sizing units 28 as illustrated at block 212. Microcomputer 42 then receives weight data from the weight stations 18, as illustrated at block 214. At block 216, microcomputer 42 receives the color signals from the color measuring devices 26, and at block 218, microcomputer receives quality data from the surface quality measuring apparatus (not shown). At block 220, microcomputer 42 determines upon which combination of the plural criteria it will be sorting, as previously defined by the user at block 208. Those skilled in the art will readily recognize that this selection can be varied for each of the lanes 12 of sorting apparatus 10. At block 224, the volume grade or diameter grade of the article is determined by comparing the volume or diameter indication, as provided by microcomputer 82, to various volume or diameter grades. Since it is rarely desirable to sort on the basis of both volume and diameter, only one of these characteristics is selected for sorting. Also at block 224, the weight grade of the article is determined by comparing its actual weight to the various weight grades defined by the user. At block 226, the color grade is determined by comparing the actual color value of the article to the color grades defined by the user. At block 228, the density of the article is determined by dividing the article's weight, as provided by the appropriate one of the weight stations 18, by the article's volume, as provided by the appropriate optical sizing unit 26. The article's density grade is then determined by comparing it to the user defined density grade values. At block 230, an indication of the shape of the article is determined by taking the ratio of the article's length to its width, i.e., dividing the indication of overall length (as computed by microcomputer 82 at block 182—FIG. 6B) by the indication of width. It will be appreciated that this ratio will be close to 1 for generally round articles, less than 1 for articles elongated in a first direction and greater than 1 for articles elongated in a second direction that is perpendicular to the first direction. Thus, while the ratio does not provide an indication of the article's shape per se, it does provide an indication of whether it is generally spherical or generally elongated in a vertical or horizontal direction. The article's shape grade is then determined by comparing the shape value to the user defined shape grades.

At blocks 232 and 234, the discharge location for this article is obtained. This is performed in the following manner. Microcomputer 42 determines the grade of the articles, as described. This grade is supplied to microcomputer 44 which determines, based on a lookup table or schedule programmed into microcomputer 44's memory by the user, the proper discharge location for the article. Thus, a discharge location is assigned to the article according to any combination of the article's weight grade, color grade, quality grade, volume or diameter grade, density grade or shape grade. This information is supplied back to microcomputer 42 via bus 48. Microcomputer 42 keeps track of the position of each item as it is transported over the discharge locations in well-known manner. See e.g., U.S. Pat. No. 4,106,628. When the article has reached its assigned discharge location, microcomputer 42 actuates that discharge location to cause the article to be discharged from the conveyor.

Figure 9:
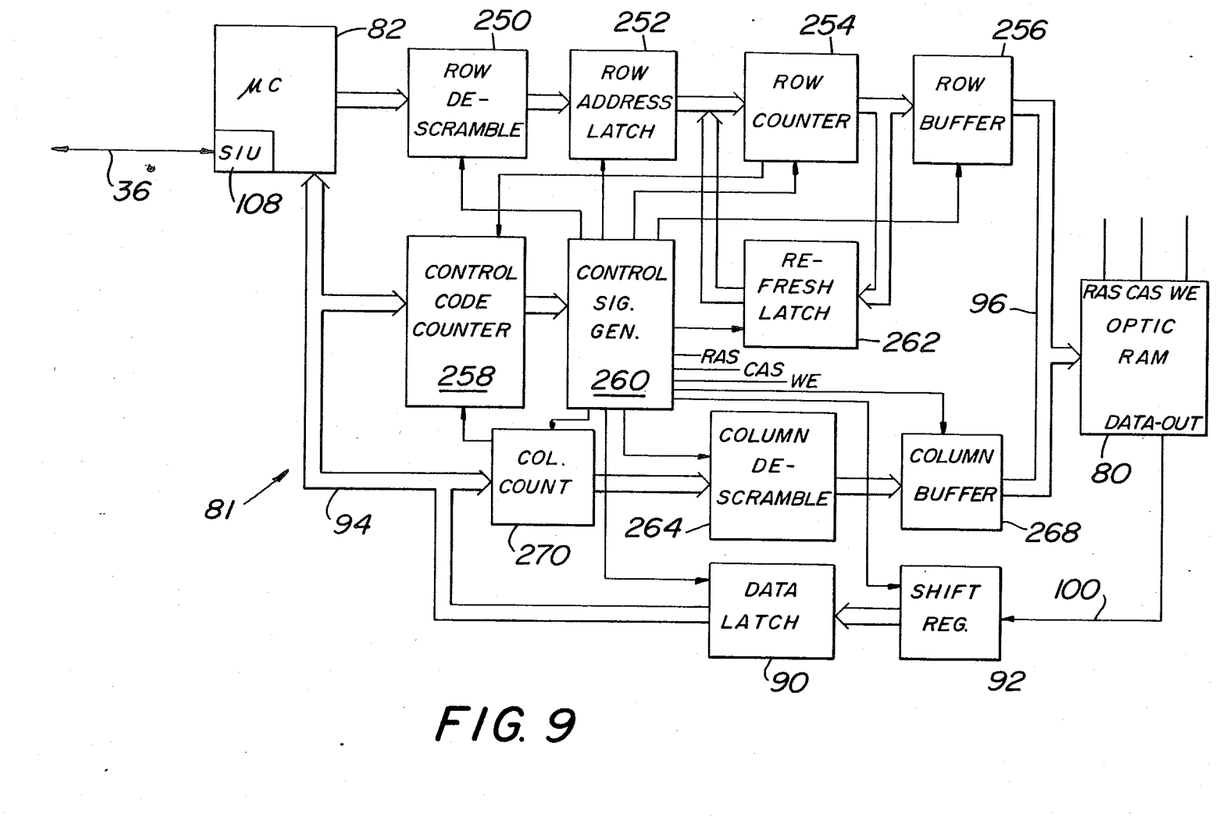
FIG. 9 is a more detailed block diagram of the electronic subsystems associated with the optical sizing apparatus.

Referring now to FIG. 9, there is illustrated a detailed block diagram of the preferred embodiment of the optical sizer processing circuitry 81. As before described, optical sizing processing circuitry comprises a microcomputer 82, such as an Intel i8744, having a serial interface unit 108 for serially communicating with peripheral devices via serial bus 36. Row descramble circuit 250, row address latch 252, row counter 254 and row buffer 256 are utilized generally for generating row addresses for reading data from and writing data into selected locations of optic RAM 80. Similarly, column counter 270, column descramble circuit 264 and column buffer 268 are utilized for generating column addresses for reading data from and writing data into selected locations of optic RAM 80. Together, the row and column addressing circuitry allow microcomputer 82 to selectively access individual memory cells in optic RAM 80. The function of each of these circuits will be described in detail hereinafter. The circuit 81 also comprises a refresh latch 262 for temporarily storing the last row address that was refreshed during a REFRESH cycle. Circuit 81 further comprises control code counter 258 and control signal generator 260 for converting signals from microprocessor 82 into special control signals for operating the circuit 81 and particularly optic RAM 80. As before described, the circuit 81 includes a shift register 92 and a data latch 90 for transferring data from optic RAM 80 to microcomputer 82.

Control code counter 258 receives READ, INITIALIZE and EXPOSE commands from microcomputer 82. Control code counter 258 also generates REFRESH commands. Together with control signal generator 260, control code generator 258 converts these commands into various control signals utilized by the remaining circuitry for implementing those commands. This includes generation of the RAS, CAS and WE commands utilized by the optic RAM for addressing row and column locations within the optic RAM and for placing the optic RAM in a read or write mode. As is known, the address lines on optic RAM 80 are scrambled, and therefore, the protocol of the optic RAM's address bus is different than that of readily available microprocessors. Row descramble circuit 250 and column descramble circuit 264 are provided basically as an interface between the optic RAM's address bus and microcomputer 82's address bus and convert microcomputer generated addresses into equivalent optic RAM addresses. Row address latch 252 is a data latch and stores the descrambled row address provided by circuit 250.

Row counter 254 has two functions. During REFRESH and INITIALIZE cycles, row counter 254 incrementally counts through and provides row addresses, starting with an address supplied by either row address latch circuit 252 or refresh latch 262, as will be explained. During a READ cycle, row counter 254 functions only as a data latch. Row buffer 256 is a plurality of tri-state buffers for interfacing the optic RAM's address bus to the row counter 254.

Refresh latch 262 is a data latch which receives a row address from row counter 254 when a REFRESH cycle is interrupted by a READ, INITIALIZE or EXPOSE cycle. Thus, refresh latch 262 stores the last row address that was refreshed before a READ, INITIALIZE, or EXPOSE cycle occurred.

Column counter 270 is a counter that has a maximum count of eight. Column counter 270 is utilized only during READ and INITIALIZE cycles. As will be explained, column counter 270 provides column addresses to optic RAM 80.

The function of column descramble circuit 264 is identical to that of row descramble circuit 250 and no further explanation is required of that circuit. Similarly, the function of column buffer 268 is identical to that of row buffer 256, and no further explanation of that circuit is required.

The functions of shift register 92 and data latch 90 have been previously described and no further explanation of their function is required.

Control code counter 258, together with control signal generator 260, converts the EXPOSE, INITALIZE and READ commands provided by microcomputer 82 to control signals which are utilized by the remaining circuitry to implement those functions. When not in one of the EXPOSE, INITIALIZE, or READ modes, control code counter 258 is in the REFRESH mode, and together with control signal generator 260, provides control signals to circuit 81 for performing the REFRESH function. Control code counter 258 enters the REFRESH mode after one of the EXPOSE, READ or INITIALIZE cycles have been completed. Moreover, the REFRESH cycle is interleaved with the INITIALIZE cycle, as will be explained hereinafter.

The operation of circuit 81 will now be explained.

REFRESH cycle

Circuit 81 is normally in a REFRESH cycle. Thus, control code counter 258, after executing any of the EXPOSE, READ or INITIALIZE cycles, always returns to a REFRESH cycle. During a REFRESH cycle, control signal generator 260 applies appropriate signals to the RAS, CAS, and WE inputs of optic RAM to place it in the REFRESH mode. Row counter 254 incrementally addresses each row of optic RAM 80 and this row address is applied through row buffer 256 to the address lines of optic RAM 80. Each addressed row is refreshed in well known manner. As is known, the column address is immaterial during a REFRESH cycle, since all columns in the addressed row are refreshed. Row counter 254 continues to increment and address each row until either a READ, INITIALIZE or EXPOSE command is received. At this time, the contents of row counter 254 are stored in refresh latch 262, i.e., refresh latch 262 stores the row address of the last row of optic RAM 80 that was refreshed. After the command (EXPOSE, INITIALIZE, READ) that interrupted the REFRESH cycle has been executed, the contents of the refresh latch are loaded back into the row counter 254 so that refreshing can resume where it left off before the interrupting command occurred. Row counter 254 is cyclic, i.e., after it has refreshed the last row address of optic RAM 80, it begins again with the first row address.

READ cycle

When a READ command is issued by microcomputer 82, the following action takes place. Microcomputer 82 reads the contents of data latch 90 which holds the result of the last READ performed by circuit 81. Microcomputer 82 then supplies the desired row and column address from which it is desired to read data. This is done by applying the desired row address to row descramble circuit 250 and the desired column address to column counter 270.

During a READ cycle, the row counter 254 acts merely as a data latch. Thus, the desired row address is applied through row buffer 256 to the optic RAM 80. Column counter 270 increments the column address supplied by microcomputer 82, and each column address supplied by column counter 270 is applied to the optic RAM's address bus via column descramble circuits 254 and column buffer 268. The function of column counter 270 is to count through eight columns. Thus, eight data bits will be read out of the optic RAM into shift register 92. The eight data bits will be the bits corresponding to the addressed row and the eight columns in that row addressed by column counter 270. When column counter 270 has counted through eight rows, it signals control code counter 258 of this event and a REFRESH cycle is entered. The parallel data byte stored in shift register 92 is strobed into data latch 90 where it is stored until the next READ cycle occurs.

INITIALIZE cycle

In the INITIALIZE cycle, it is desired to write the same digital data into all of the optic RAM's memory cells. Thus, in the INITIALIZE cycle, optic RAM 80 is placed in a WRITE mode and circuit 81 addresses each individual memory cell and writes the same digital data (either digital "1" or digital "0") into each cell. This is done in the following manner.

Microcomputer 82 supplies the row address of the row where initialization is to begin to row descramble 250. The descrambled row address is supplied to row counter 254 via latch 252. Similarly, the column address of the column where initialization is to begin is supplied to column counter 270. Row counter 254 incrementally counts through the row addresses, beginning with the descrambled address supplied by circuit 250. Each row address counted by row counter 254 is applied to the optic RAM's address bus. For each row address supplied by row counter 254, column counter 270 incrementally counts through all of the column addresses. Each column address is also applied to the optic RAM's address bus via column descramble circuit 264 and column buffer 268. Thus, every memory cell in the currently selected row is initialized by virtue of column counter 270. When this action has been completed for the currently selected row, row counter 254 is incremented to the next row address and this row is initialized in the same manner. This action is repeated for each row until eight rows have been initialized. Row counter 254 supplies a signal to control code counter 258 after each eighth row has been initialized. A REFRESH cycle is then performed, and after a refresh of the entire array has been completed, the next eight rows are initialized in the aforementioned manner. This process is repeated until all rows and columns have been initialized. Row counter 254 and column counter 270 signal the completion of the INITIALIZE cycle to control code counter 258 which thereafter places circuit 81 in an REFRESH cycle.

EXPOSE cycle

An EXPOSE cycle is initiated by issuing an EXPOSE command that sets an EXPOSE bit in the control code counter 258, thereby rendering the optic RAM 80 light sensitive by inhibiting REFRESH cycles. The REFRESH is inhibited during an EXPOSE cycle in the following manner. As is noted, optic RAM 80 has two arrays. Only one of the arrays ("active array") is used for image processing. The other array ("inactive array") is not used. During an EXPOSE command, the circuit 81 refreshes inactive array, rather than the active array. The length of time that this is done is the exposure time. The exposure time is governed by a software timer in microcomputer 82's control algorithm. When the software timer indicates that the EXPOSE cycle is completed, this event is signaled to control code counter 258 and a REFRESH cycle is entered.

As can be seen from the foregoing, circuit 81 performs all of the functions necessary for obtaining a digital image of an article (EXPOSE cycle), transferring the digital image to microcomputer 82 (READ cycle), initializing the image sensing array (INITIALIZE cycle) and for keeping the contents of the image array refreshed (REFRESH cycle).

There has been described an apparatus and method for sorting articles according to plural criteria, including novel apparatus for obtaining an indication of an article's volume, length, diameter, shape and density.

For the purpose of illustrating the invention, there is shown in the drawings a form which is presently preferred; it being understood, however, that this invention is not limited to the precise arrangements and instrumentalities shown.

We claim:

1. Apparatus for sorting an article according to plural criteria comprising:
   (a) conveyance means for transporting the article through a plurality of inspection stations, the conveyance means including means for raising individual articles to a location having an elevation above all other articles being transported;
   (b) first inspection station means adjacent said location for obtaining an image of the entire upper surface of the article at one time and providing data signals indicative of the article's volume;
   (c) second inspection station means for providing data signals indicative of the article's color;
   (d) third inspection station means for providing data signals indicative of the article's weight;
   (e) processing means receiving the data signals from the first, second and third inspection stations for categorizing the article into one of a plurality of grades based upon a desired combination of the article's volume, color and weight; and
   (f) discharge means coupled to the processing means for discharging the article from the conveyance means at a selected location based upon the grade into which the article has been categorized.

2. Apparatus according to claim 1 further comprising fourth inspection station means for providing data signals indicative of the article's surface quality, the data signals from the fourth inspection station means being supplied to the processing means, the processing means further categorizing the article according to the article's surface quality.

3. Apparatus according to claim 1 wherein the first inspection station means further comprises means for providing data signals indicative of the article's overall length.

4. Apparatus according to claim 3 wherein the first inspection station means further comprises means for providing data signals indicative of the article's diameter.

5. Apparatus according to claim 4 wherein the processing means further comprises means for providing an indication of the article's shape based upon a ratio of the article's overall length to the article's diameter, the processing means further categorizing the article to one of the grades according to the article's shape.

6. Apparatus according to claim 4 wherein the processing means further comprises means for categorizing the article into one of the grades according to the article's diameter.

7. Apparatus according to claim 3 wherein the first inspection station means further comprises means for providing data signals indicative of the article's width and the processing means further comprises means for providing an indication of the article's shape based upon a ratio of the article's overall length to the article's width, the processing means further categorizing the article into one of the grades according to the article's shape.

8. Apparatus according to claim 1 wherein the processing means further comprises means for providing an indication of the article's density and for categorizing the article into one of the plurality of grades according to the article's density.

9. Apparatus according to claim 1 wherein the first inspection station means comprises a source of illumination, a light sensitive dynamic random access memory, a lens focusing an image of the article onto the light sensitive dynamic random access memory, and control means coupled to the light sensitive dynamic random access memory for receiving data bits provided by the light sensitive random access memory, the data bits collectively defining a digital image of the article, the control means being operative according to a control algorithm to process the digital image to compute values indicative of the length of cross section of corresponding contiguous slices of the article, square each value, sum the squared values and provide a data word indicative of the value of the sum.

10. Apparatus for optically sizing articles comprising:
 (a) first means for transporting articles up an incline of a selected angle to a location having an elevation at which an individual article is above all other articles being transported;
 (b) second means disposed overhead the location for illuminating the article;
 (c) third means disposed overhead the location for focusing an image of each article onto an image sensing array, the image sensing array containing a plurality of rows and columns of light sensitive memory cells and providing a digital image of the article; and
 (d) fourth means associated with the image sensing array for processing the digital image by modeling the article as a plurality of contiguous columns of first and second digital data states, the fourth means computing values indicative of the length and number of columns of first digital data states, the length of each column of first digital data states being indicative of the length of cross section of a corresponding slice of the article, the number of columns of first digital data states being indicative of the overall length of the article, the fourth means providing a data word indicative of the article's overall length.

11. Apparatus according to claim 10 wherein the fourth means further comprises means for providing data words indicative of the volume and diameter of each article.

12. Apparatus according to claim 11 wherein the means for providing a data word indicative of the volume of each article comprises a microcomputer operative according to a control algorithm to square the values of the length of each column of first digital data states, sum together the squared values and provide a data word indicative of the sum.

13. Apparatus according to claim 11 wherein the means for providing a data word indicative of the diameter of each article comprises a microcomputer operative according to a control algorithm to determine the length of the centermost column of first digital data states and provide a data word indicative thereof.

14. Apparatus according to claim 10 wherein the selected angle is substantially 10° with respect to the horizontal.

15. Apparatus according to claim 10 wherein the image sensing array comprises a light sensitive dynamic random access memory and the fourth means comprises a microcomputer.

16. Dimensional sizing apparatus comprising:
 (a) an image sensing array having a plurality of individually addressable light sensitive memory cells for acquiring and storing a digital image of the entire upper surface of an article and a data output for providing serial data bits representative of a data state of each memory cell;
 (b) serial to parallel data conversion means coupled to the data output for receiving and converting a predetermined number of serial data bits to a parallel data word on a repeated basis; and
 (c) processing means receiving the parallel data words supplied by the serial to parallel data conversion means for computing a data word having a value indicative of a dimensional characteristic of the article.

17. Dimensional sizing apparatus according to claim 16 wherein the individual memory cells are organized by rows and columns and the processing circuitry is selectable among, read, write, refresh and expose modes for reading data out of the memory cells, writing data into the memory cells, refreshing the data stored in the memory cells and altering the contents of the memory cells based upon a light image incident upon the memory cells, further comprising:
 (a) addressing means operable under control of the processing means for selectively addressing each of the memory cells by row and column;
 (b) control means operable under control of the processing means for selectively placing the image sensing array in read and write modes; and
 (c) lens means for focusing an image of the article on the image sensing array.

* * * * *